United States Patent
He et al.

(10) Patent No.: US 10,348,949 B2
(45) Date of Patent: Jul. 9, 2019

(54) SYNCHRONIZATION SYSTEM AND METHOD THEREOF

(71) Applicant: Xiaoyi Technology Co., Ltd., Shanghai (CN)

(72) Inventors: Chao He, Shanghai (CN); Qing Hao, Shanghai (CN); Changjiang Wei, Shanghai (CN)

(73) Assignee: SHANGHAI XIAOYI TECHNOLOGY CO., LTD., Shanghai (CN)

(*) Notice: Subject to any disclaimer, the term of this patent is extended or adjusted under 35 U.S.C. 154(b) by 303 days.

(21) Appl. No.: 15/259,483

(22) Filed: Sep. 8, 2016

(65) Prior Publication Data

US 2018/0027167 A1   Jan. 25, 2018

(30) Foreign Application Priority Data

Jul. 21, 2016   (CN) .......................... 2016 1 0578584

(51) Int. Cl.
   H04N 5/232    (2006.01)
   H04N 13/296   (2018.01)
   H04N 5/247    (2006.01)
   H04N 13/243   (2018.01)

(52) U.S. Cl.
   CPC ..... *H04N 5/23203* (2013.01); *H04N 5/23206* (2013.01); *H04N 5/23238* (2013.01); *H04N 5/247* (2013.01); *H04N 13/243* (2018.05); *H04N 13/296* (2018.05)

(58) Field of Classification Search
   CPC .......... H04N 5/23203; H04N 5/23209; H04N 5/23219; H04N 5/23216; H04N 13/296; H04N 5/247
   See application file for complete search history.

(56) References Cited

U.S. PATENT DOCUMENTS

| | | | | |
|---|---|---|---|---|
| 2003/0193577 A1* | 10/2003 | Doring | ............. | G08B 13/19634 348/211.99 |
| 2008/0049116 A1* | 2/2008 | Tojima | .................... | H04N 5/232 348/222.1 |
| 2010/0151903 A1* | 6/2010 | Yamamoto | ............. | H04N 5/235 455/556.1 |
| 2011/0109725 A1* | 5/2011 | Yu | ............................ | H04N 7/147 348/47 |
| 2011/0205380 A1* | 8/2011 | Shirakawa | ............. | H04N 5/232 348/211.9 |
| 2011/0252265 A1* | 10/2011 | Iwami | .................. | H04N 19/645 713/401 |
| 2011/0305281 A1* | 12/2011 | Yoshimura | ............. | H04N 19/70 375/240.25 |
| 2013/0038746 A1* | 2/2013 | Hosokawa | ............. | G03B 17/00 348/211.99 |
| 2014/0253741 A1* | 9/2014 | Okada | ................ | H04N 5/23222 348/207.1 |
| 2015/0296118 A1* | 10/2015 | Okazaki | ................... | H04B 5/02 348/211.99 |
| 2017/0289426 A1* | 10/2017 | Chang | ................ | H04N 5/23206 |

* cited by examiner

*Primary Examiner* — Abdelaaziz Tissire
(74) *Attorney, Agent, or Firm* — Cantor Colburn LLP

(57) ABSTRACT

Methods and apparatus for synchronizing a plurality of devices are disclosed. According to certain embodiments, the synchronizing methods may include receiving a signal for initiating an operation. The methods may also include prioritizing a processing power for the operation. The methods may further include starting the operation at a calculated amount of time after receiving the signal.

23 Claims, 8 Drawing Sheets

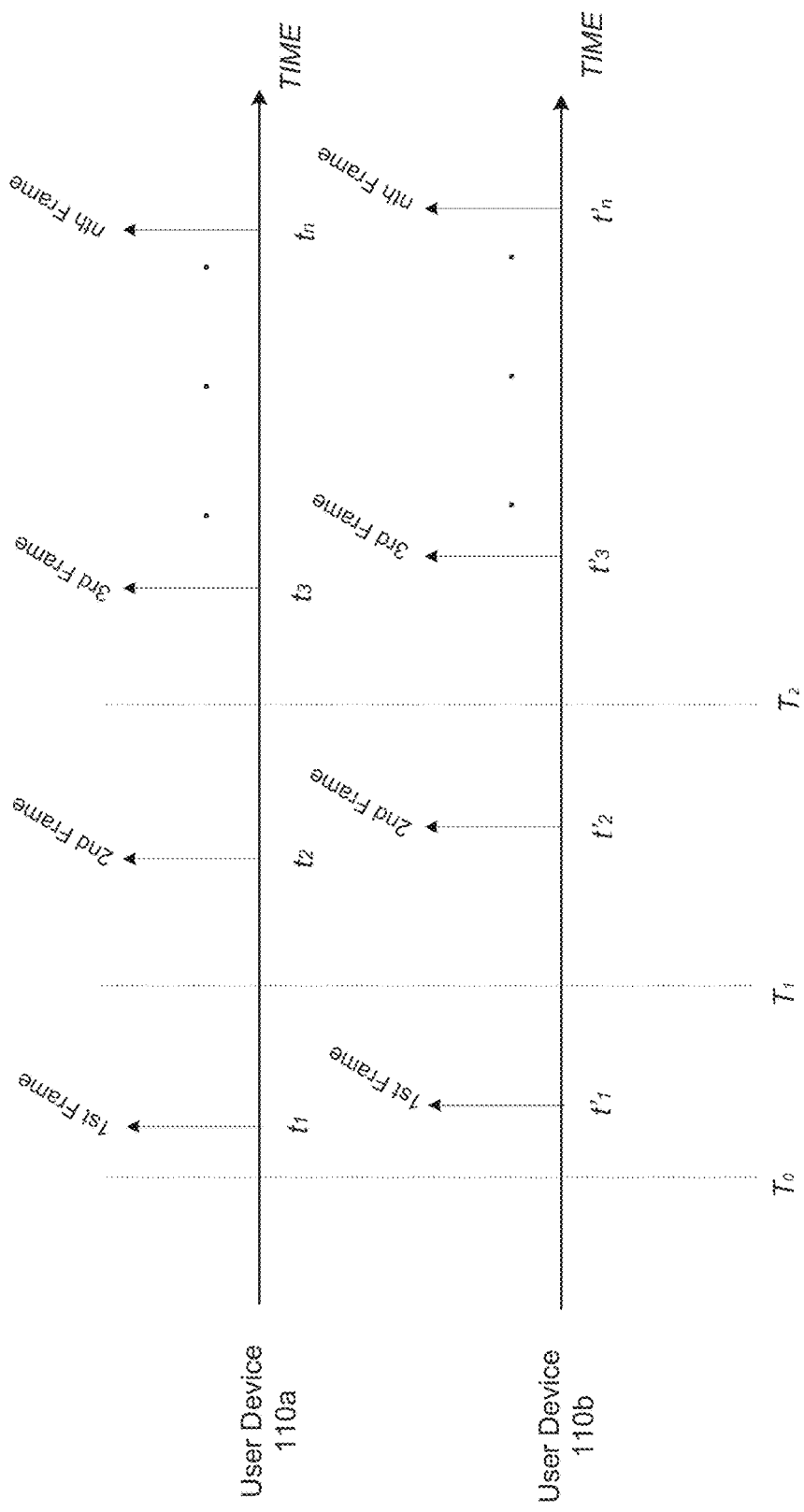

SYNCHRONIZATION SYSTEM AND METHOD THEREOF

CROSS-REFERENCE TO RELATED APPLICATION

This application is based upon and claims priority from Chinese Patent Application No. 201610578584.X, filed on Jul. 21, 2016, the disclosure of which is expressly incorporated herein by reference in its entirety.

TECHNICAL FIELD

The present disclosure generally relates to imaging systems, and more specifically to systems and methods for synchronizing multiple devices.

BACKGROUND

In many industrial, commercial, and scientific applications, it is critical to precisely synchronize multiple devices or control the multiple devices to operate in a coordinated manner. For example, to create an immersive virtual-reality (VR) experience, multiple cameras may be used to cover different parts of a scene. Image frames captured by the cameras at the same time are synthesized to achieve a three-dimensional (3D) reconstruction of the scene. When the scene is dynamic, i.e., containing moving objects, a well-known challenge is precisely synchronizing the image capturing at frame level or even sub-frame level (i.e., a fraction of the duration of a frame).

A key task in immersive VR production is accurately reconstructing 3D object shape, motion, and surface texture from multi-view 2D image data. Similar to human eyes seeing objects at the right depth through binocular vision, multiple cameras may be used to shoot images of an object from different viewpoints. For an object in motion, unless the images with different viewpoints are captured at the same time, no proper stereoscopic display of the object can be generated.

FIG. 1 is a schematic diagram illustrating a multi-camera system for obtaining 3D image information of an object. Referring to FIG. 1, two cameras, i.e., cameras 1 and 2, may be separated apart by a predetermined distance and aligned to shoot a moving car. The differences between the images taken by the two cameras at the same time may be interpreted to determine the depth information of the car. However, if cameras 1 and 2 are unsynchronized, the image frame captured by camera 1 at time $T_1$ cannot be combined with the image frame captured by camera 2 at time $T_2$ to construct a virtual scene showing the right depth.

Moreover, a viewer of VR is free to look anywhere in the virtual world. Therefore, VR needs to provide a wide field of view (FOV), such as a 360-degree spherical view. Since a camera only has a limited FOV, images shot by multiple camera may be combined into a panorama. FIG. 2 is a schematic diagram illustrating a multi-camera system for obtaining a panorama. Referring to FIG. 2, cameras 1 and 2 have partially overlapping FOVs. Each FOV covers part of a scene including a moving car traveling past several motionless tires. If the two cameras are unsynchronized, when the car is traveling in the overlapping area of the FOVs, the image frame captured by camera 1 at time $T_1$ and the image frame captured by camera 2 at time $T_2$ show the car camera 1 at different pixels. Such pixel difference is usually called the "ghosting" artifact. That is, the panorama generated from these two image frames may show the moving car as double images, or "ghosts," at the area where the two frames overlap. In contrast, because the still tires always stay at the same pixels, the tires have no ghosts.

The disclosed methods and systems address one or more of the problems listed above.

SUMMARY

Consistent with one embodiment of the present disclosure, there is provided a synchronizing method of a first device. The method may include receiving a signal for initiating an operation. The method may also include prioritizing a processing power for the operation. The method may further include starting the operation at a calculated amount of time after receiving the signal.

Consistent with another embodiment of the present disclosure, there is provided a first device including a memory and a processor. The memory may store instructions. The processor may be configured to execute the instructions to receive a signal for initiating an operation; prioritize a processing power for the operation; and start the operation at a calculated amount of time after receiving the signal.

Consistent with yet another embodiment of the present disclosure, there is provided a synchronization system. The system may include a signal generator and a plurality of devices communicatively connected to the signal generator. The signal generator may be configured to, in response to a user input, send a signal to the devices. The devices are configured to receive the signal; prioritize a processing power for the operation; and start the operation at a calculated amount of time after receiving the signal.

It is to be understood that both the foregoing general description and the following detailed description are exemplary and explanatory only and are not restrictive of the invention, as claimed.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a schematic diagram illustrating an implementation of the process shown in FIG. 7, according to an exemplary embodiment.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
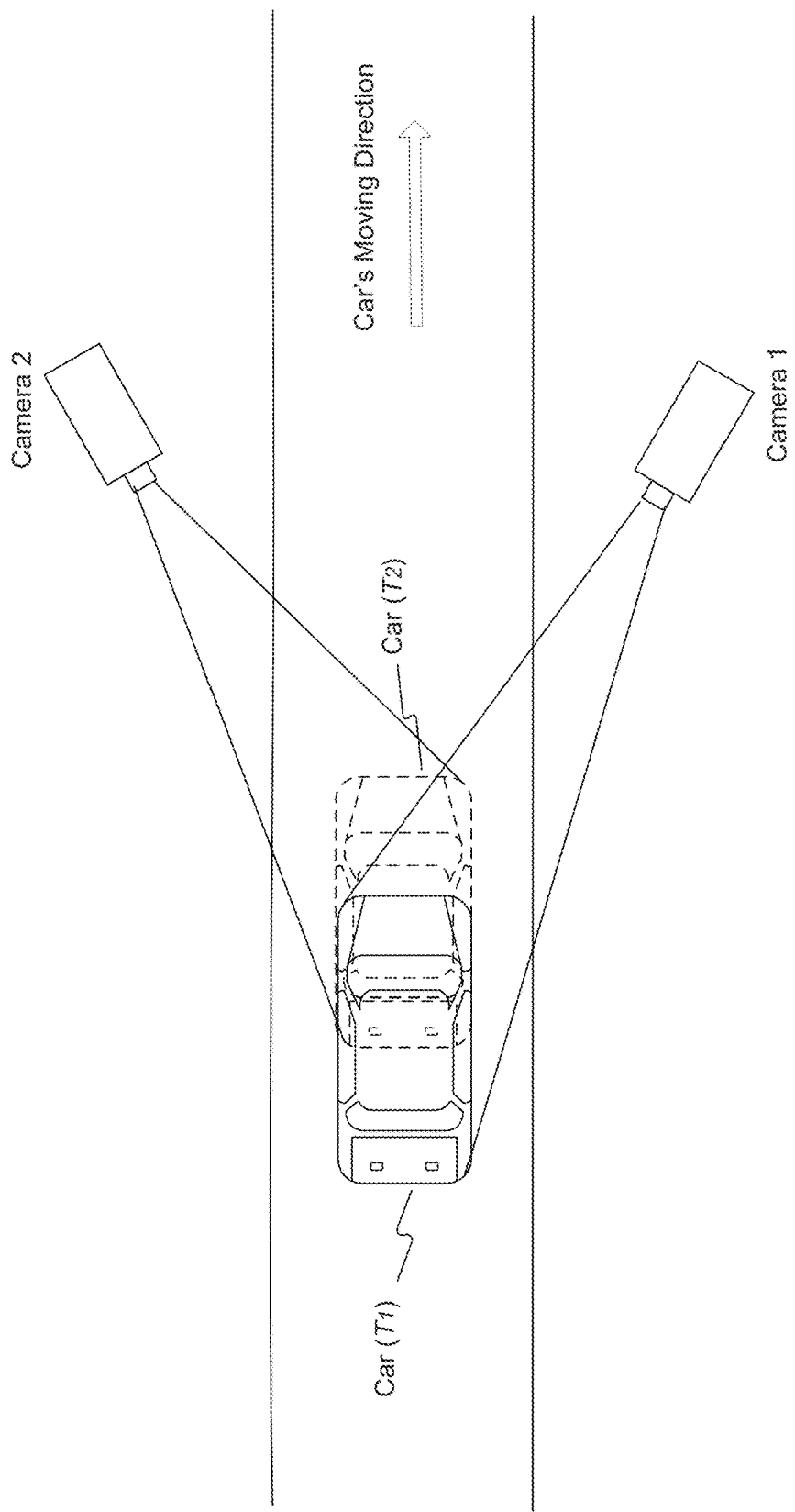
FIG. 1 is a schematic diagram illustrating a multi-camera system for obtaining 3D image information of an object.
Figure 2:
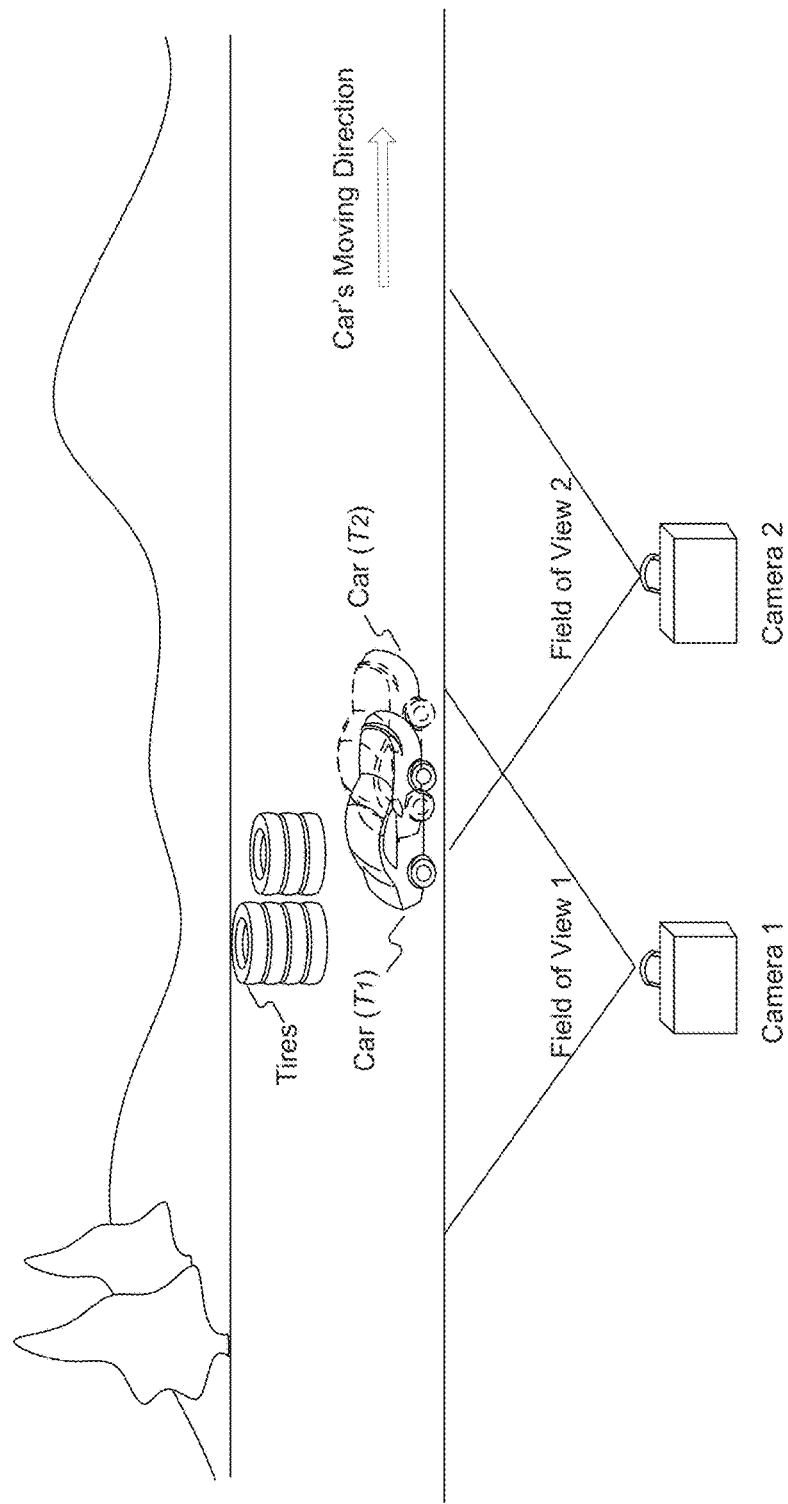
FIG. 2 is a schematic diagram illustrating a multi-camera system for obtaining a panorama.

As illustrated by FIGS. 1-2, fast changing scenes, such as sports venues or concerts, may present tremendous difficulty in producing stereoscopic 3D content and/or lead to severe ghosting artifacts in panorama generation, even if the time differences of the image frames generated by different cameras are tiny. To create satisfactory immersive VR experience, it is desirable to control these time differences to within only a few milliseconds.

However, the precise synchronization of multiple cameras has been difficult to achieve. The workflow for each camera to capture images includes: activating the camera (or activating the synchronized photographing mode of the camera); setting shooting parameters for use in the camera and starting the image sensor to capture an image frame (i.e., trigger the shutter operation); initiating the image signal processor (ISP) of the camera to acquire the frame data and encode the frame data into a renderable and displayable image; and repeating the frame capturing and encoding. Synchronization errors may happen in any of the above steps.

First, the activation of the cameras, the frame capturing, and the frame encoding need to be simultaneously triggered by external trigger signals. However, there may be time delays in transmitting these trigger signals. Some trigger signals may also accidentally be lost during the transmission. In particular, when the trigger signals are delivered wirelessly, uncertainty may be introduced by non-determinism in wireless media access time. It is difficult to make certain when a synchronization packet started to propagate from a sender and when the synchronization packet is received by a receiver. For example, the latency of a typical wireless networks may be in the order of several milliseconds.

Second, even if the multiple cameras can simultaneously receive commands to take images, the image sensors in different cameras may respond to the commands at different speeds. The image sensors may be originally in different states. Thus, each camera needs to reset the respective image sensor and send the sensor operation parameters, such as shutter speed, frame rate, resolution, etc., to the driver of the image sensor. Due to the disparity among the image sensors and the diverse hardware and software capacities of the cameras, each camera has a non-deterministic latency from the time of receiving a trigger signal for taking images and the time of capturing a frame.

Third, even if the multiple cameras can start the frame capturing at the same time, the multiple cameras may start the frame data acquisition and encoding at different speeds, due to the different real-time working conditions/loads in the cameras. For example, when the cameras receiving commands to initiate frame acquisition and encoding, each camera may perform many other applications, such as measuring the remaining battery power, adjusting the zoom, etc. Performing these extra tasks may consume the processor time and memory space, and thus may introduce a non-deterministic latency among the cameras for initiating the data acquisition and encoding.

Figure 3:
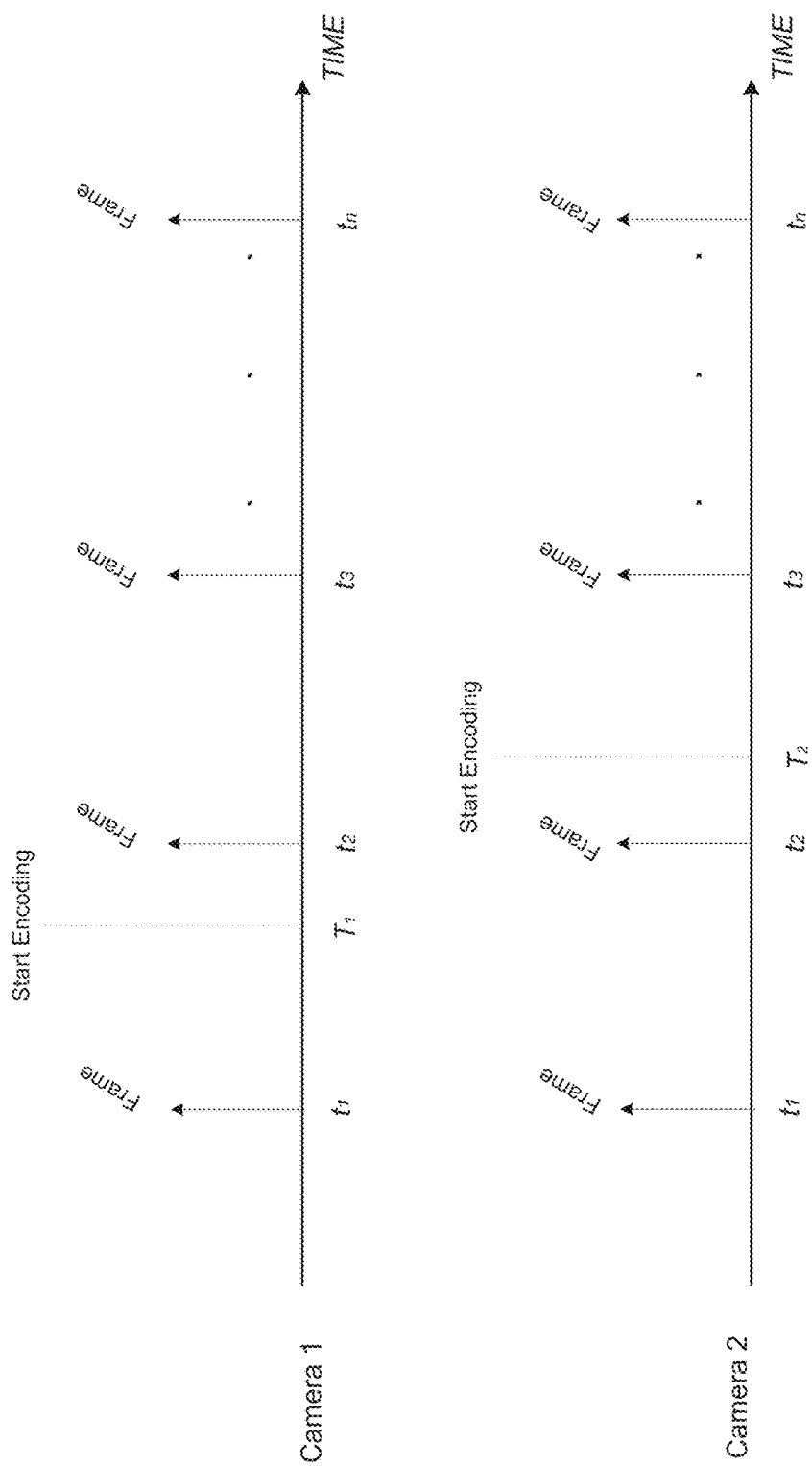
FIG. 3 is a schematic diagram illustrating unsynchronized frame data encoding between two cameras.

FIG. 3 is a schematic diagram illustrating unsynchronized frame-data encoding between two cameras. Referring to FIG. 3, the image sensors in cameras 1 and 2 are synchronized. That is, cameras 1 and 2 are capable of simultaneously capturing frames at time $t_1$, $t_2$, $t_3$, . . . . However, the frame-data encoding in cameras 1 and 2 are unsynchronized. For example, camera 1 starts the encoding at time $T_1$, which is between $t_1$ and $t_2$. In contrast, camera 2 starts the encoding at time $T_2$, which is after $t_2$. Thus, camera 1 encodes the frame captured at $t_1$ and treats it as the first frame, while camera 2 encodes the frame captured at $t_2$ and treats it as the first frame. These two frames cannot be properly combined to generate the VR effect.

Fourth, the multiple cameras need to repeatedly capture and encode the frames at a predetermined rate. Thus, even if both the frame capturing and encoding in different cameras are initiated simultaneously, the synchronization may still be destroyed because of subsequent clock drifts in part or all of the cameras. For example, each camera may use a crystal oscillator as an internal clock. Due to the frequency error inherent to each crystal oscillator and the discrepancy in accuracy across different crystal oscillators, after the multiple cameras starts a continuous imaging process, the clock signal in one camera may gradually drift apart or desynchronize from the clock signal in another camera.

Figure 4:
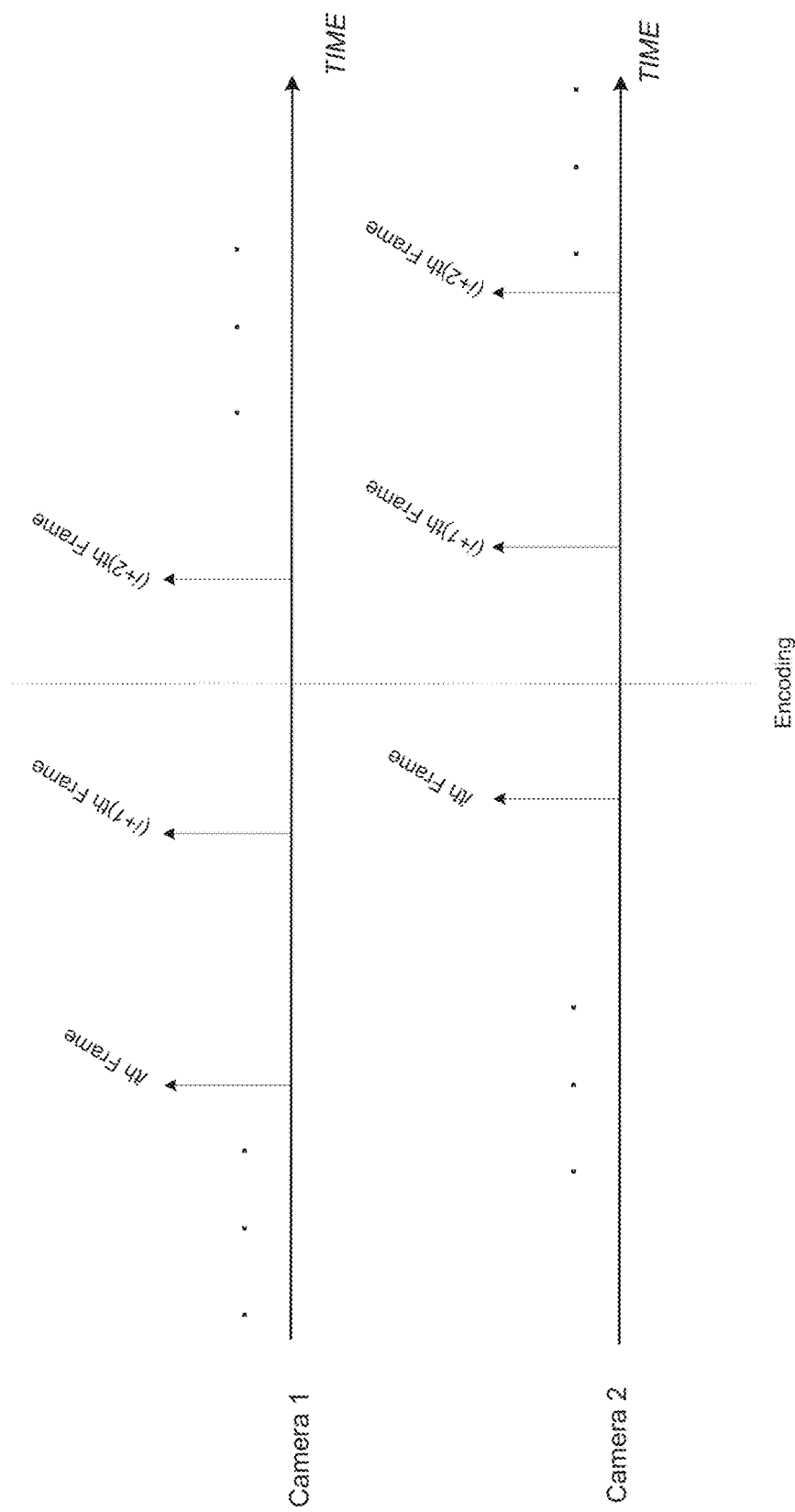
FIG. 4 is a schematic diagram illustrating clock drift between two cameras.

FIG. 4 is a schematic diagram illustrating clock drift between two cameras. Referring to FIG. 4, the frame capturing and encoding by cameras 1 and 2 may be initially synchronized. However, as the imaging process continues, clock drift may accumulate between cameras 1 and 2. For example, after two hours, the image sensor in camera 1 may capture the (i+1)th frame before the image sensor in camera 2 captures the ith frame. Thus, cameras 1 and 2 can no longer simultaneously imaging a dynamic scene. Moreover, if these two frames are encoded at the same or similar time, they may be treated as frames captured at the same time, which may cause error in producing the VR effect.

A flaw in any of the above aspects can cause loss of the synchronization. As described below, the exemplary embodiments consistent with the present disclosure provide technical solutions to overcome one or more of the above-identified difficulties.

Figure 5:
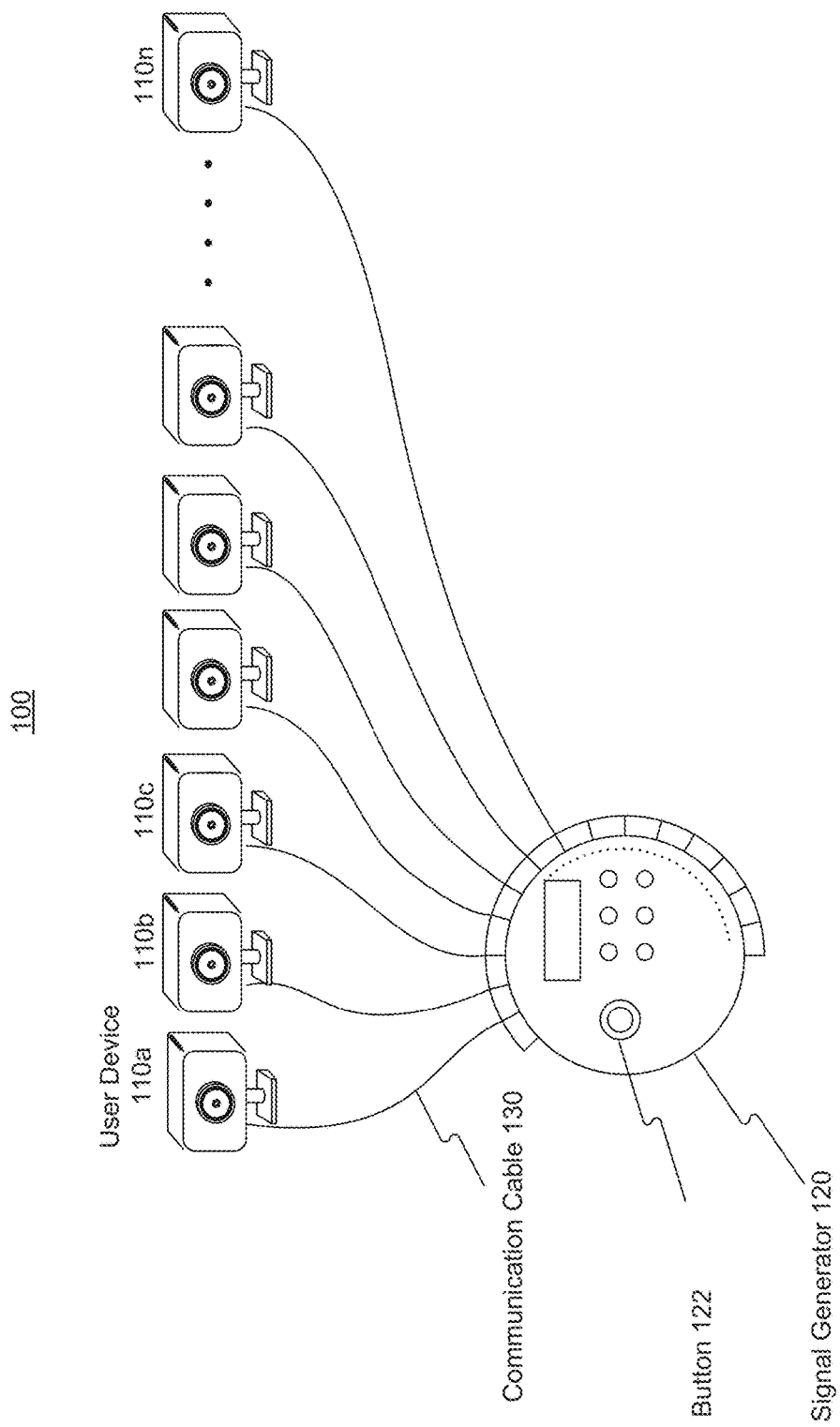
FIG. 5 is a block diagram of a system for synchronizing a plurality of user devices, according to an exemplary embodiment.

FIG. 5 is a block diagram of a system 100 for synchronizing a plurality of user devices, according to an exemplary embodiment. Referring to FIG. 5, system 100 includes a plurality of user devices 110 (e.g., user devices 110a, 110b, 110c, . . . and 110n illustrated in FIG. 5), a signal generator 120, and a plurality of communication cables 130 for connecting user devices 110 and signal generator 120.

Each user device 110 may be a device with certain computing and/or communication capabilities, such as a smart camera, a smart wearable device (e.g., a wrist band), a smart air conditioner, a smart air purifier, a smart refrigerator, a smart socket, a smart door bell, etc. User devices 110 may be the same or different types of devices. For example, all user devices 110 may be smart cameras that can be triggered by signal generator 120 to simultaneously shoot a video of an object. For another example, user devices 110 may be different devices such as a smart air conditioner, a smart air purifier, and a smart coffee maker, etc., respectively, and these different user devices 110 may be simultaneously turned on by signal generator 120.

Solely for the purpose of illustration, the following description assumes user devices 110 are smart cameras capable of shooting a video simultaneously. The cameras disclosed herein can be any type of image capturing device. For example, user device 110 may be an action camera, a digital camera, or a web camera. User device 110 may also be imbedded in another device, such as a smartphone, a computer, a personal digital assistant (PDA), a monitoring device, a video gaming console, etc.

User device 110 may be configured to capture one or more images in a variety of ways. For example, user device 110 may be configured to capture images initiated by a user, by programming, by hardware setting, or by a combination thereof. In some embodiments, when user device 110 is configured to capture images by software or hardware programming or by hardware setting, image capturing can be performed at one or more predetermined conditions. For example, user device 110 can capture images in response to a user's operation, for example, the user's pushing a control button on signal generator 120. Alternatively, or additionally, a set of predetermined conditions, for example, the sensing of a moving object, can trigger user device 110 to capture images. In some embodiments, capturing images may include that user device 110 is in a mode or setting capable of capturing one or more images. As used herein, an "image" can refer to, in part or in whole, a static or dynamic visual representation including, but not limited to, a photo, a picture, a graphic, a video, a hologram, a virtual reality image, an augmented reality image, other visual representations, or combination thereof.

Signal generator 120 is configured to generate trigger signals for triggering an operation in each user device 110, so as to synchronize the operations of some or all of user devices 110. Signal generator 120 may be an independent device specially designed for synchronizing the operations of user devices 110. Alternatively, signal generator 120 may be part of a larger device, such as a computer, a mobile phone, a personal digital assistant (PDA), an MP3 (Moving Picture Experts Group Audio Layer III) player, an MP4 player, etc. Signal generator 120 may include a user input device such as a keyboard, a touchscreen, or a touch pad to enable user input. Moreover, signal generator 120 may be implemented through hardware, software, or a combination of hardware and software.

Referring to FIG. 5, in one exemplary embodiment, signal generator 120 may be a remote control device that includes a button 122. Signal generator 120 may include a circuit configured to respond to a user activation of button 122, by generating trigger signals to trigger an operation of one or more user device 110.

Wired connections, such as communication cables 130, are used to connect and thus allow two-way communications between each user device 110 and signal generator 120. In one embodiment, user devices 110 may include an interface, such as a micro Universal Serial Bus (USB) interface, configured to receive a communication cable 130. Similarly, signal generator 120 may include a plurality of ports, such as micro USB ports, such that a communication cable 130 may connect each user device 110 with signal generator 120. This way, signal generator 110 may send trigger signals to each user device for simultaneously triggering certain operation by user devices 110. For example, the trigger signal may be a high voltage pulse capable of activating a sensor of each user device 110. Wired connections can avoid extra transitions and conversions of signals, and provide a more reliable channel for the signal transmission in some applications than wireless connections. Thus, communication cables 130 can minimize the signal delay and loss.

In some embodiments, however, signal generator 120 may also transmit the trigger signals to user devices 110 wirelessly. For example, each user device 110 may include an infrared signal transceiver, a near field communication (NFC) signal transceiver, a Bluetooth antenna, and/or a wireless router to facilitate short-range two-way communications between user device 110 and signal generator 120.

Figure 6:
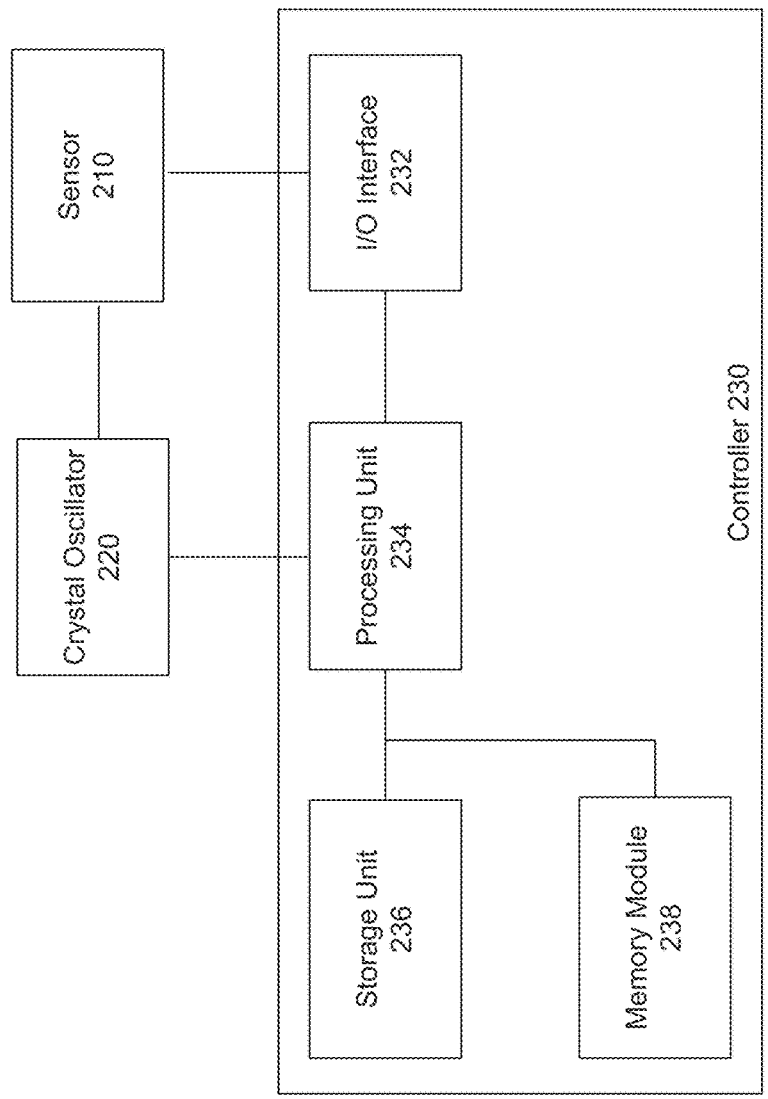
FIG. 6 is a block diagram of a user device for performing a synchronization method, according to an exemplary embodiment.

FIG. 6 is a block diagram of a user device 110, according to an exemplary embodiment. Referring to FIG. 6, user device 110 may include a sensor 210, a crystal oscillator 220, and a controller 230.

Sensor 210 may be an image sensor, such as a charge-coupled device (CCD) sensor or a complementary metal-oxide-semiconductor (CMOS) sensor. Sensor 210 may also include any of optical devices, lens, CCD or CMOS driving circuitry, and other arrangements of optical components, electronic components, and control circuitry used in transmitting and receiving light of various wavelengths.

Sensor 210 is configured to convert the optical signals (e.g., photons) into electronic signals (e.g., electron charges). Sensor 210 has a photoelectric conversion surface (a light-receiving surface) in which a plurality of photo detectors are arranged to form a pixel matrix. Sensor 210 photo-electrically converts the incident light, focused on the photoelectric conversion surface through the lens and aperture mechanism of user device 110, into electrical changes. Sensor 210 is driven by a driver. An exposure time of sensor 210 (i.e., a shutter speed) is adjusted by the sensor driver according to commands received from the controller 230. Sensor 210 outputs the accumulated charges in the pixels as image signals to an analog-to-digital (A/D) converter through a variable gain amplifier. Controller 230 sets the amplification factor of the amplifier. The amplification factor corresponds to an ISO sensitivity (i.e., sensitivity to light), e.g., ISO 200, ISO 400, ISO 800, or ISO 1600. The A/D converter converts the amplified image data into a digital form and sends the digital data to controller 230 for further processing. Such a process is referred to as "capturing an image" or "capturing a frame" in the present disclosure.

In a video recording mode or a successive picture recording mode, sensor 210 may be configured to capture image frames with various resolutions and frame rates, such as 1296$p$ at 30 fps, and 1080p at 30 fps or 60 fps. The frame rate of sensor 210 is the inverse of the time needed for sensor 210 to acquire an image frame and then completely read out that image frame. The readout rate of sensor 210 is governed by the time required to digitize a single pixel (i.e., convert analog signals to digital signals) and is defined as the inverse of that digitization time. The frame rate of sensor 210 incorporates the light exposure time and extends the single pixel readout rate to the entire pixel array.

The frame rate is determined by the combined frame acquisition time and frame read time, each of which depends upon operational details specific to sensor 210. Quantitatively the frame rate may be expressed by the following equation:

Frame Rate=1/(Frame Acquisition Time+Frame Read Time)   (Eq. 1)

A number of basic operations typically contribute to the frame acquisition and frame read time intervals. The frame acquisition time may be determined by, but not limited to: 1) time required to clear charges from each pixel prior to beginning signal integration (i.e., light exposure), 2) shutter opening delay, 3) light exposure time, and 4) shutter closing delay. The frame read time may be determined by, but not limited to, digitization time per pixel multiplied by the number of pixels to be read.

In particular, prior to image acquisition, it is necessary for sensor 210 to clear the pixel array of charges that may have accumulated prior to light exposure, due to dark current or other charge-generating events. Elimination of any charge accumulated in the pixel array before starting the actual frame integration reduces the phenomenon of image smear, as well as allowing more precise control of exposure time from frame to frame.

As seen from described above, before sensor 210 captures the first frame, user device 110 needs a non-negligible amount of time to prepare for the frame capturing. For example, user device 110 needs to perform a series of tasks, including adjusting the focus, setting the flash, setting the image resolution, measuring and gathering other shooting parameters, and selecting an appropriate shutter duration and aperture opening. Also for example, sensor 210 needs to clear residual charges from each pixel prior to capturing each new frame. Only after the required parameters are set and the residual charges are cleared, the shutter may open and sensor 210 may start the frame capturing.

The time taken to clear the residual charge in sensor 210, as well as to read and set the shooting parameters may range from tens of milliseconds to as long as a few seconds. Thus, there is always a lag between pressing the shutter button and the actual starting of frame capturing. Moreover, due to the hardware differences, different user devices 110 may have different shutter lags.

Consistent with the disclosed embodiments, the shutter lag may be shortened through hardware design, so as to reduce the synchronization error in starting the frame capturing. For example, the shooting parameters commonly used in the synchronized imaging mode may be held in a buffer of controller 230, such that the parameters may be readily accessed by a processor. For another example, some shooting parameters may be written into a firmware integrated into sensor 210, so as to reduce the time involved in providing the parameters to sensor 210.

As described in more detail in method 1000 (FIG. 7), synchronization error caused by the shutter lag may also be avoided through software design. For example, user devices 110 may be programed, upon receiving a trigger signal, to set the shooting parameters and reset sensor 110 with a predetermined time duration, and to initiate sensor 110 to capture the first frame (i.e., open the shutter to start signal integration) at the end of the predetermined time duration. The predetermined time duration may be log enough to allow each user device 110 to finish setting the shooting parameters and resetting sensor 110. This way, sensors 210 in all user devices 110 may start the frame capturing simultaneously.

Crystal oscillator 220 is an electronic oscillator circuit that uses the mechanical resonance of a vibrating crystal of piezoelectric material, such as quartz crystal, to create an electrical signal with a precise frequency. The frequency generated by crystal oscillator 220 may be supplied to sensor 210 and controller 230 to precisely control their operations. In exemplary embodiments, to ensure the precise synchronization of multiple user devices 110, high-accuracy crystal oscillators, such as crystal oscillators with a frequency tolerance of 5 parts per million (ppm), may be used. 5 ppm frequency tolerance corresponds to a five-microsecond drift every second.

In practice, a crystal oscillator labeled with 5 ppm may actually have a frequency tolerance slightly different from 5 ppm. This is because manufacturing variations and exposure to out-of-tolerance conditions (e.g., mechanical shock) may cause permanent frequency errors in the crystal oscillators. In addition, variations in the temperature, age, humidity, etc., may result in short-terms errors in the crystal oscillators. For example, the actual frequency tolerances of fifty crystal oscillators labeled with 5 ppm may form a normal distribution centered on 5 ppm.

Such discrepancy in actual frequency tolerance may be solved through improved manufacturing method of user devices 110 or hardware modification to user devices 110. In one embodiment, a large number of 5 ppm crystal oscillators may be tested and sorted according to their actual frequency tolerances. The crystal oscillators may further be divided into several groups, with the oscillators in each group having less than 1 ppm difference. Oscillators from the same group may then be used on user devices 110 that need to be synchronized. For example, if sixteen user devices 110 need to be synchronized, fifty crystal oscillators may be tested and sorted according to their actual frequency tolerances. Sixteen crystal oscillators with less than 1 ppm difference may then be selected and separately installed on the sixteen user devices 110.

In another embodiment, a crystal oscillator may be used to provide clock signals to all the user devices 110 that need to be synchronized. For example, dedicated circuits may be used to connect the crystal oscillator to each user device 110, so as to provide the same clock signals to each user device 110.

Controller 230 may include, among other things, an input/output (I/O) interface 232, a processing unit 234, a storage unit 236, and/or a memory module 238. These units may be configured to transfer data and send or receive instructions between or among each other.

I/O interface 232 may be configured for two-way communication between controller 230 and various components of user device 110 and other devices, such as sensor 210 and signal generator 120. For example, I/O interface 230 may receive a trigger signal transmitted from signal generator 120 and relay the trigger signal to processing unit 234 for initiating the video capturing. As another example, I/O interface 230 may receive the image data generated by sensor 210 and relay the data to processing unit 234 for encoding, or to storage unit 236 and/or memory module 238 for storage.

Processing unit 234 may be implemented with one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Processing unit 234 may execute computer instructions (program code) and perform functions in accordance with techniques described herein. Computer instructions include routines, programs, objects, components, data structures, procedures, modules, and functions, which perform particular functions described herein.

Each of storage unit 236 and/or memory module 238 includes one or more memories configured to store the instructions and data used for synchronizing user devices 110. The memories may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Storage unit 236 and/or memory module 238 may be configured to store the computer instructions and data that may be used by processing unit 234 to perform functions of user device 110. For example, storage unit 236 and/or memory module 238 may store a synchronization application for precisely control the timing of collecting and encoding the frame data. As another example, storage unit 236 and/or memory module 238 may store each encoded image frame, such that later the encoded image frame may be combined with frames generated by other user devices 110 to form a panorama.

Figure 7:
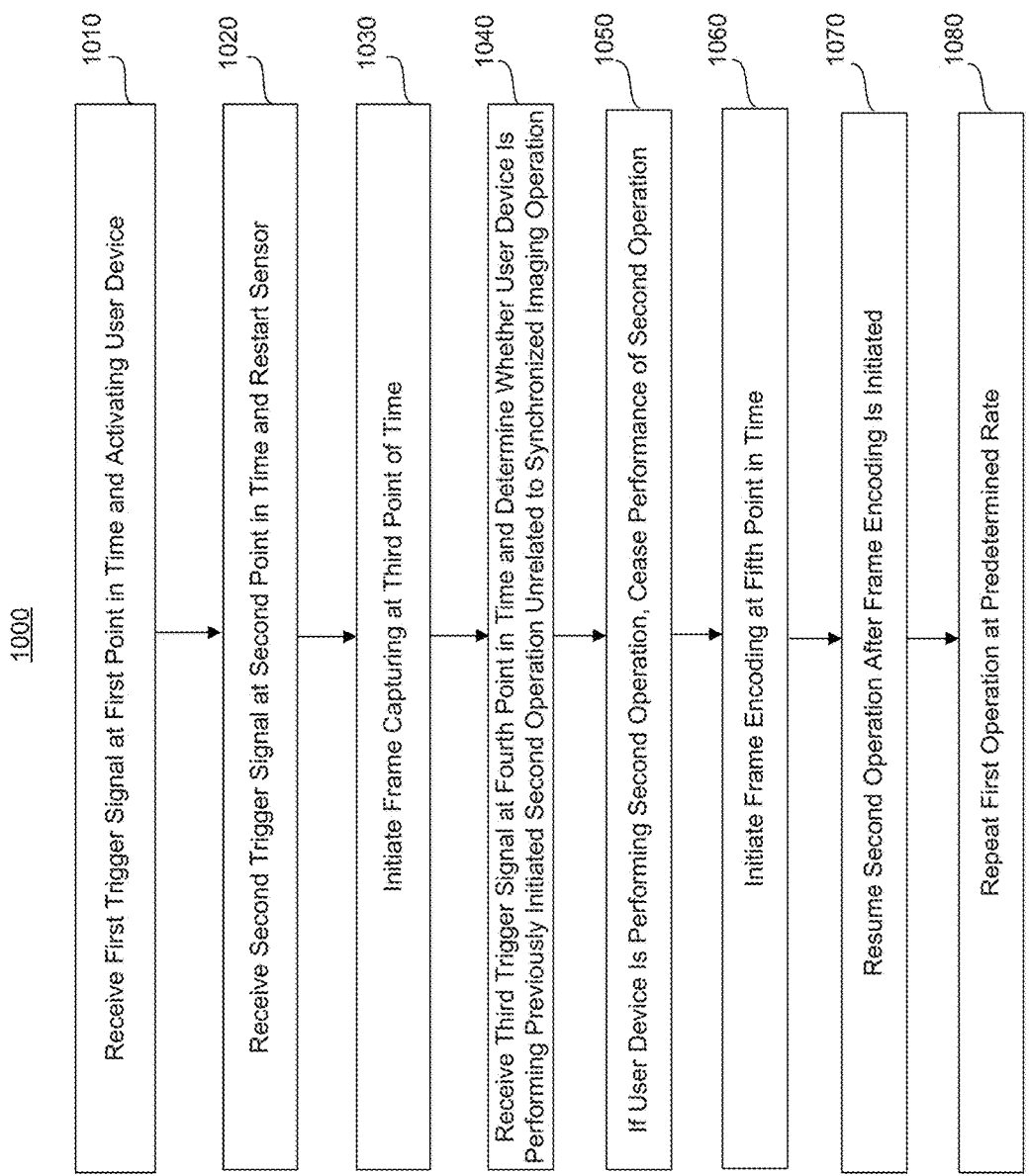
FIG. 7 is a flowchart of a process for synchronizing a plurality of user devices, according to an exemplary embodiment.

FIG. 7 is a flowchart of a process 1000 for synchronizing the operations, that is, tasks, of multiple user devices, according to an exemplary embodiment. For example, process 1000 may be performed by controller 230. Referring to FIG. 7, process 1000 may include the following steps.

In step 1010, controller 230 receives a first trigger signal at a first point in time and activates user device 110.

In exemplary embodiments, each user device 110 is connected to signal generator 120 through communication cables 130. To activate user devices 110, a user may push button 122 of signal generator 120. In response to the user operation, signal generator 120 may transmit a first trigger signal to each user device 110.

If user device 110 is originally turned off or is in an idling state, the first trigger signal may serve to activate user device 110. In one embodiment, the liquid crystal display (LCD) of user device 110 may go to a sleep mode and user device 110 may power down when user device 110 has been idle for a given period of time. Upon receiving the first trigger signal, user device 110 may take up to several seconds to wake up and be ready for shooting images.

After receiving the first trigger signal, controller 230 may perform certain tasks to prepare for image capturing. For example, controller 230 may load shooting parameters and/or instructions for synchronizing user device 110 to a buffer or memory module 238, to allow fast accessing of the parameters and instructions.

In step 1020, controller 230 receives a second trigger signal at a second point in time and resets sensor 210.

Before the second trigger signal is received, sensor 220 may be in various states. For example, sensor 220 may be active, allowing electrical charges to continuously fill up the pixels. For another example, sensor 210 may be in a sleep state, to help reduce heat and improve the signal-to-noise ratio. Similar to pressing a "shutter release" button on a camera, the second trigger signal serves to reset sensor 210 and gets it ready for capturing new frames. Thus, upon receiving the second trigger signal, controller 230 may ensure the shutter closed and allow sensor 210 to clear any residual charges.

The resetting of sensor 210 also requires controller 230 to set the shooting parameters for sensor 210. In one embodiment, controller 130 may determine proper settings for the scene or subject to be imaged. Based on the determination, controller 230 may adjust the focus and zoom of user device 110, set the image quality, set the timing and duration of an electric flash, select an appropriate shutter duration and aperture opening, and/or measure and gather other shooting parameters.

For example, if an auto-focus mode is used, controller 230 may determine the auto-focus setting. Controller 230 may then determine the white balance—color correction—of the scene. Following this, controller 230 may calculate and set the exposure.

For another example, controller 230 may set a proper frame rate for sensor 210. As described above, the frame rate of sensor 210 is determined by multiple factors. For example, the frame rate is partially determined by the frame read time, which in turn is the result of multiplying the digitization time per pixel by the number of pixels to be read. If the number of pixels to be read changes, the frame read time and thus the frame rate change, too. Thus, with different shooting parameters, sensor 210 may achieve different frame rates. For example, user device 110 may record video in various resolutions and frame rates, such as 1080p/30 fps, 1080p/60 fps, 960p/48 fps, 720p/120 fps, 480p/240 fps, etc.

However, to synchronize the video recording in multiple user devices 110, sensor 210 in each user device 110 is desired to work with the same operation parameters, such that the frames generated by the multiple user devices 110 may be combined. Thus, controller 230 may prescribe a uniform frame rate for sensor 210. For example, if 1080p/30 fps are the resolution and frame rate used for sensor 210 in the synchronized imaging mode, controller 230 may set 1080p/30 fps for sensor 210.

In step 1030, controller 230 initiates the frame capturing at a third point of time.

The difference between the third point in time and the second point in time is set to be a predetermined value sufficiently long to allow all user devices 110 to completing the resetting of respective sensor 210. Due to the diversity in processing speed, different user devices 110 may take different time durations to reset respective sensor 210. After a user device 110 accomplishes the clearing of the residual charges on respective sensor 210 and the setting of the shooting parameters, user device 110 may hold respective sensor 110 inactive until the third point in time. Thus, sensor 210 in a user device 110 with a faster processing speed may be kept inactive longer before the third point in time.

At the third point in time, all user devices 110 may activate respective sensors 210 and start the frame capturing at the same time. This way, the differences in shutter lags across all user devices 110 may be minimized. Specifically, each controller 230 opens the respective shutter and exposes respective sensor 210 to light. The shutter remains open for a specified exposure duration before closing again, allowing sensor 210 to perform signal integration. The integrated signals may then be read out and sent to controller 230. The cycles of light exposure and pixel readout may be repeated at the frame rate to capture frames successively. The captured frames are saved in a buffer (e.g., part of storage unit 236 and/or memory module 238) before they are further processed by controller 230.

In step 1040, controller 230 receives a third trigger signal at a fourth point in time and determines whether user device 110 is performing a previously initiated second operation unrelated to the synchronized imaging operation.

This second operation is performed because before receiving the trigger signal, user device 110 may be running multiple processes at the same time. For example, user device 110 may be running an application to playback the images captured previously. As another example, user device 110 may be periodically monitoring and displaying the remaining battery power. These processes are unrelated to the synchronized imaging operation but consume the computing power of controller 230, and therefore may slow down the speed of processing the captured frames.

In step 1050, if user device 110 is performing the second operation, controller 230 ceases performance of the second operation, for example, by suspending or terminating the second operation.

"Suspend" refers to a situation in which controller 230 temporarily pauses the execution of a program for certain amount of time. When the program is suspended, it is "asleep." It does not run in the central processing unit (CPU) but is still present in the memory and may have operation states stored, such that it can be "awakened" to begin execution in a short time. In contrast, "terminate" refers to a situation in which controller 230 causes a program to completely "die," such that the program is removed from both the CPU and the memory. Thus, if the program is terminated, it takes a longer time for controller 230 to call the program next time.

By suspending or terminating the second operation, controller 230 can devote the maximum available computing power to process the frames captured by sensor 210, and thus may minimize the latency from the time of receiving the third trigger signal and the time of starting encoding the captured frames. By reducing this latency, controller 230 may reduce the error in synchronizing the frame encoding.

In step 1060, controller 230 initiates frame encoding at a fifth point in time.

As described in step 1030, the frames captured by sensor 210 are saved in a buffer for further processing. Controller 230 may then read the captured frames from the buffer and encode the frames to produce processed images. The processed images can be image files formatted for display on a display screen, for storage in memory, and the like. In one embodiment, controller 230 may perform encoding steps including clean Bayer processing, demosaicing, and the like, as well as compression to format the image data for output. Controller 230 may process the image data to generate image or video files in standard formats, such as JPEG, PNG, TIFF, AVI, or MPEG. In some embodiments, controller 230 may encode the frames at the frame rate used by sensor 210, so that the frame capturing and encoding can be synchronized.

All user devices 110 are programed to initiate the frame encoding at the fifth point in time. Because operations unrelated to the synchronized imaging operation are suspended or terminated (step 1050), the difference between the fifth point in time and the fourth point in time can be set very short, e.g., a few milliseconds. This way, any error in synchronizing the frame ending may be limited with this difference.

In practice, despite the synchronization mechanism to reset sensors 210 (steps 1020-1030), it may still be possible that different sensors 210 start the frame capturing at slightly different points in time. In view of this possibility, the fifth point in time may be well separated from the third point in time, in order to minimize the risk of frame mismatch. This situation is explained below by referring to FIG. 8. FIG. 8 is a schematic diagram illustrating an implementation of process 1000, according to an exemplary embodiment. Referring to FIG. 8, sensors 210 in user devices 110a and 110b (hereinafter referred to as sensors 210a and 210b respectively) are resetted to initiate the frame capturing at the third point in time $T_0$ (e.g., 0 ms) to start the video capturing. Subsequently, sensor 210a may generate a frame at each time point of $t_1$, $t_2$, $t_3$, etc. And sensor 210b may generate a frame at each time point of $t'_1$, $t'_2$, $t'_3$, etc. Moreover, controllers 230 in user devices 110a and 110b (hereinafter referred to as controllers 230a and 230b respectively) obtain and encode the frames at each time point of $T_1$, $T_2$, $T_3$, etc. Here $T_1$ is the fifth point in time at which controllers 230a and 230b start to obtain and encode the first frames generated by sensors 210a and 210b respectively.

In practice, due to the difference in system configuration, sensors 210a and 210b may generate the first frames at slightly different points in time, i.e., $t_1$ and $t'_1$, respectively. For example, $t_1=10$ ms and $t'_1=11$ ms. If both sensors 210a and 210b operate at a frame rate of 30 fps, each of sensors 210a and 210b may generate a frame approximately every 33 ms. For example, sensors 210a and 210b may generate the respective second frames at approximately $t_2=43$ ms and $t'_2=44$ ms. If the fifth point in time $T_1$ is set at 10.5 ms, the first frame generated by sensor 210a would not be obtained and encoded by controller 230a. Worse, since the second frame generated by sensor 210a is actually the first frame obtained and encoded by controller 230a. The second frame generated by sensor 210a would be combined with the first frame generated by sensor 210b to form the panorama. Thus, a frame mismatch is resulted.

To solve the above-described problem, the fifth point in time $T_1$ may be selected as a value significantly different from $t_1$ and $t'_1$, such that $T_1$ practically cannot fall in between $t_1$ and $t'_1$. For example, if experiments show that $t_1$ and $t'_1$ are usually located within the range of 10 ms-11 ms, $T_1$ may be set as 20 ms. This can prevent a controller 230 from omitting the first frame generated by the corresponding sensor 210.

In step 1070, controller 230 resumes the second operation after the frame encoding is initiated.

After the starting of the frame encoding, the computing power of controller 230 no longer needs to be dedicated to ensure the accurate initiation of encoding. Accordingly, controller 230 may resume the previously suspended or terminated second operation.

In step 1080, user device 110 repeats the frame capturing and encoding according to a predetermined rate.

Here, the predetermined rate is the frame rate of sensor 210. For example, if the frame rate used for synchronization purpose is 30 fps, controller 230 may also repeat the frame encoding at a rate of 30 Hz. In exemplary embodiments, to ensure the frame synchronization throughout the entire course of the video capturing, the frequency of crystal oscillator 220 may be used to prevent the system clock of user device 110 from drifting.

In summary, the present disclosure provides a technical solution to synchronizing the imaging process of multiple cameras. First, dedicated communication cables are used to transmit the trigger signals, so as to minimize signal delay and loss. For example, the signal transmission time in the wired connections can be limited to a few microseconds, which makes it possible to reduce the synchronization error to a few milliseconds.

Second, the workflow of each camera is divided into multiple stages, including camera activation, sensor resetting, and frame encoding. Each stage is triggered and synchronized separately. Sufficient time is allowed between the stages to enable the preparation for the next stage. This way, the overall precision of synchronization can be improved.

In some embodiments, the trigger signals for different stages may be distinguished by the information carried by the trigger signals. For example, the trigger signals may be coded with a unique identifier (UID). The UIDs may be implemented as different voltage levels. A first voltage level may be used for identifying the activation of the camera. A second voltage level may be used for identifying the resetting of the image sensors. A third voltage level may correspond to the initiation of frame encoding.

Third, in the sensor-resetting stage, all the image sensors are resetted before a common point in time and then activated to initiate the frame capturing at the common point in time. Thus, the differences of shutter lag across the cameras can be reduced.

Fourth, when a command for initiating the frame encoding is received, the cameras suspend or terminate the operations unrelated to the imaging process, so as to reduce the latency of starting the frame encoding. Moreover, the timing of frame encoding is well separated from the timing of frame capturing, and thus the risk of frame mismatch can be minimized.

Fifth, high accuracy crystal oscillators may be used to reduce the clock drift among the cameras. For example, the crystal oscillators used for synchronization purpose may be selected from a large number of crystal oscillators through testing and sorting. For another example, a crystal oscillator may be used to provide clock signals to all the cameras.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A synchronizing method of a first device, comprising:
receiving a first signal to reset an image sensor of the first device;
in response to the first signal, resetting the image sensor of the first device;
controlling the image sensor to start capturing image frames at a first amount of time after the first signal is received;
receiving a second signal for initiating a first operation;
prioritizing a processing power for the first operation including, in response to receiving the second signal, (i) determining whether the first device is currently performing a second operation and if so, (ii) ceasing performance of the second operation; and
starting the first operation at a second amount of time after receiving the second signal.

2. The method of claim 1, wherein the first device receives the first or second signal via a wired connection.

3. The method of claim 1, further comprising:
after the first operation is started, resuming the second operation.

4. The method of claim 1, wherein the first operation comprises encoding the image frames at a predetermined rate.

5. The method of claim 4, wherein:
the first operation is performed by a second device;
the method is used to synchronize the first operation in the first device and in the second device; and
the first and second devices maintain the predetermined rate according to a frequency of a crystal oscillator.

6. The method of claim 1, further comprising:
calculating the first amount of time based on a time duration required to reset the image sensor.

7. The method of claim 6, wherein:
the first operation is performed by a second device that includes an image sensor;
the method is used to synchronize the first operation in the first device and in the second device; and
the first amount of time is longer than the time durations required by the first and second devices to reset the respective image sensors.

8. The method of claim 1, wherein resetting the image sensor comprises:
preventing the image sensor from capturing image frames during the first amount of time.

9. The method of claim 1, wherein:
after the capturing is started, controlling the image sensor to capture the image frames at the predetermined rate.

10. The method of claim 9, wherein:
the first operation is performed by a second device that includes an image sensor;
the method is used to synchronize the operation in the first device and in the second device;
the image sensor of the first device generates two successive image frames at points in time of $t_1$ and $t_2$;
the image sensor of the second device generates two successive image frames at points in time of $t_1'$ and $t_2'$; and
calculating the second amount of time such that the first device starts encoding the image frames at point in time of T, wherein $t_1 < T < t_2$ and $t_1' < T < t_2'$.

11. The method of claim 1, further comprising:
before the first signal is received, receiving a third signal; and
in response to the third signal, activating the first device.

12. A first device, comprising:
a memory storing instructions; and
a processor configured to execute the instructions to:
receive a first signal to reset an image sensor of the first device;
in response to the first signal, reset the image sensor of the first device;
control the image sensor to start capturing image frames at a first amount of time after the first signal is received;
receive a second signal for initiating a first operation;
prioritize processing power for the first operation including, in response to receiving the second signal, (i) determining whether the first device is currently performing a second operation and if so, (ii) ceasing performance of the second operation; and
start the first operation at a second amount of time after receiving the second signal.

13. The first device of claim 12, wherein the processor is further configured to execute the instructions to:
after the first operation is started, resume the second operation.

14. The first device of claim 12, wherein the first operation comprises encoding the image frames at a predetermined rate.

15. The first device of claim 14, wherein the processor is further configured to execute the instructions to:
calculate the first amount of time based on a time duration required to reset the image sensor.

16. The first device of claim 15, wherein:
the first operation is performed by a second device that includes an image sensor; and the first amount of time is longer than the time durations required by the first and second devices to reset the respective image sensors.

17. The first device of claim 14, wherein the processor is further configured to execute the instructions to:
prevent the image sensor from capturing image frames during the first amount of time.

18. The first device of claim 14, wherein the processor is further configured to execute the instructions to:
after the capturing is started, control the image sensor to capture the image frames at the predetermined rate.

19. The first device of claim 14, wherein:
the operation is performed by a second device that includes an image sensor;
the image sensor of the first device generates two successive image frames at points in time of $t_1$ and $t_2$;
the image sensor of the second device generates two successive image frames at points in time of $t_1'$ and $t_2'$; and
the processor is further configured to execute the instructions to:
calculate the first amount of time such that the first device starts encoding the image frames at point in time of T, wherein $t_1<T<t_2$ and $t_1'<T<t_2'$.

20. A synchronization system, comprising:
a signal generator; and
a plurality of devices communicatively connected to the signal generator;
wherein:
the signal generator is configured to, in response to a user input, send a signal to the devices; and
the devices are configured to:
receive the signal for initiating a first operation;
prioritize a processing power for the first operation including, in response to receiving the signal, (i) determining whether each of the plurality of devices is currently performing a second operation and if so, (ii) ceasing performance of the second operation; and
start the first operation at a calculated amount of time after receiving the signal.

21. The system of claim 20, where the devices are connected to the signal generator via wired connections.

22. The system of claim 20, wherein:
the system further comprises a crystal oscillator communicatively connected to the plurality of devices; and
wherein the devices are further configured to:
perform the first operation according to a frequency of the crystal oscillator.

23. The system of claim 20, wherein:
the devices comprise crystal oscillators having a specified frequency tolerance; and
differences among actual frequency tolerances of the crystal oscillators are less than a predetermined threshold.

* * * * *